US012632368B1

(12) United States Patent
Chakraborty et al.

(10) Patent No.: US 12,632,368 B1
(45) Date of Patent: May 19, 2026

(54) SYSTEM, METHOD, AND COMPUTER PROGRAM FOR TEST ENVIRONMENTS AS A SEVICE

(71) Applicant: Amdocs Development Limited, Limassol (CY)

(72) Inventors: Prasenjit Chakraborty, Pune (IN); Jainam Mehta, Gujarat (IN); Jogindersingh Ramani, Navsari (IN); Sahil Singh, Pune (IN)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 97 days.

(21) Appl. No.: 17/849,502

(22) Filed: Jun. 24, 2022

(51) Int. Cl.
*G06F 9/44* (2018.01)
*G06F 11/3668* (2025.01)
*G06F 11/3698* (2025.01)

(52) U.S. Cl.
CPC ...... *G06F 11/3688* (2013.01); *G06F 11/3692* (2013.01); *G06F 11/3698* (2025.01)

(58) Field of Classification Search
CPC ............. G06F 11/3688; G06F 11/3664; G06F 11/3692
See application file for complete search history.

(56) References Cited

U.S. PATENT DOCUMENTS

| | | | |
|---|---|---|---|
| 10,210,073 B1 * | 2/2019 | Baruch ............... | G06F 11/3664 |
| 2003/0115212 A1 * | 6/2003 | Hornibrook ........ | G06F 11/3457 |
| 2015/0026664 A1 * | 1/2015 | Bartley ............... | G06F 11/3676 |
| | | | 717/124 |
| 2015/0254161 A1 * | 9/2015 | Baril ................... | G06F 11/3616 |
| | | | 717/124 |
| 2016/0342499 A1 * | 11/2016 | Cheng ................. | G06F 11/3644 |
| 2020/0249936 A1 * | 8/2020 | Barfield, Jr. ............. | G06F 8/60 |
| 2020/0250074 A1 * | 8/2020 | Zhang ................. | G06F 11/3664 |
| 2021/0089437 A1 * | 3/2021 | Reid ................... | G06F 11/3684 |

* cited by examiner

*Primary Examiner* — Hang Pan
(74) *Attorney, Agent, or Firm* — Zilka-Kotab, P.C.

(57) ABSTRACT

As described herein, a system, method, and computer program provide a test environment as a service. The service provides a user interface presenting a plurality of configurable parameters for creating a test environment. The service receives, via the user interface, user input defining configurations for one or more configurable parameters of the plurality of configurable parameters. The service creates the test environment in accordance with the configurations.

16 Claims, 4 Drawing Sheets

100

102 — provide, by a service, a user interface presenting a plurality of configurable parameters for creating a test environment 104 — receive, by the service via the user interface, user input defining configurations for one or more configurable parameters of the plurality of configurable parameters 106 — create, by the service, the test environment in accordance with the configurations

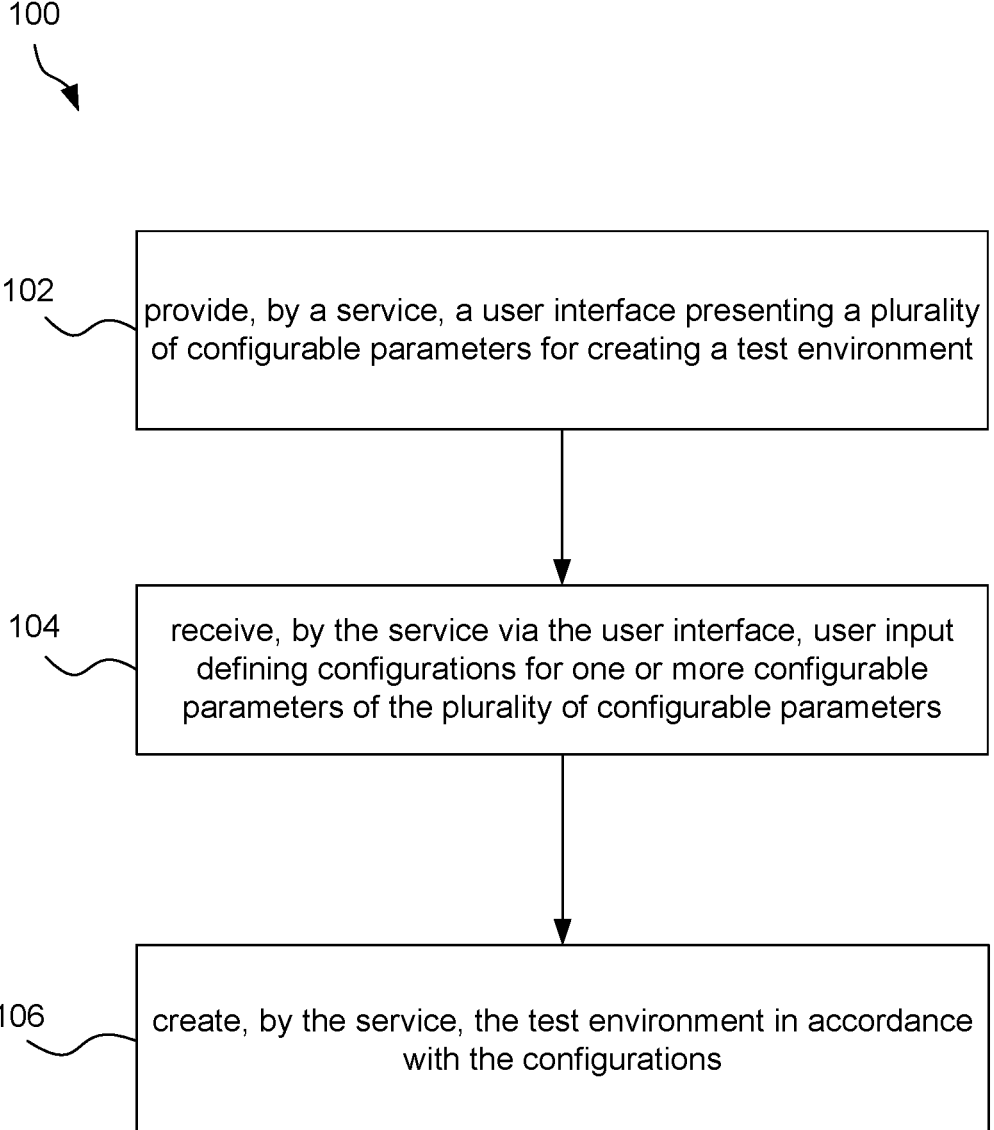

100

102 — provide, by a service, a user interface presenting a plurality of configurable parameters for creating a test environment 104 — receive, by the service via the user interface, user input defining configurations for one or more configurable parameters of the plurality of configurable parameters 106 — create, by the service, the test environment in accordance with the configurations

SYSTEM, METHOD, AND COMPUTER PROGRAM FOR TEST ENVIRONMENTS AS A SEVICE

FIELD OF THE INVENTION

The present invention relates to software testing.

BACKGROUND

Traditionally, software is tested before deployment to ensure that the software is free of defects and executes as intended. However, testing oftentimes relies on running the software in one or more different test environments which mimic the environments (e.g. computer hardware and/or software configurations) in which the software may be deployed. For example, a defect may only be reproducible with a specific set of data which needs to be made available in a testing environment. To date, there is a lot of dependency on Devops to create the environments for testing, as well as for development and support focals. On the other hand, maintaining full stack is sometimes cumbersome and costly.

There is thus a need for addressing these and/or other issues associated with the prior art.

SUMMARY

As described herein, a system, method, and computer program provide a test environment as a service. The service provides a user interface presenting a plurality of configurable parameters for creating a test environment. The service receives, via the user interface, user input defining configurations for one or more configurable parameters of the plurality of configurable parameters. The service creates the test environment in accordance with the configurations.

BRIEF DESCRIPTION OF THE DRAWINGS

FIG. 1 illustrates a method of a test environment as a service, in accordance with one embodiment.

DETAILED DESCRIPTION

Figure 2:
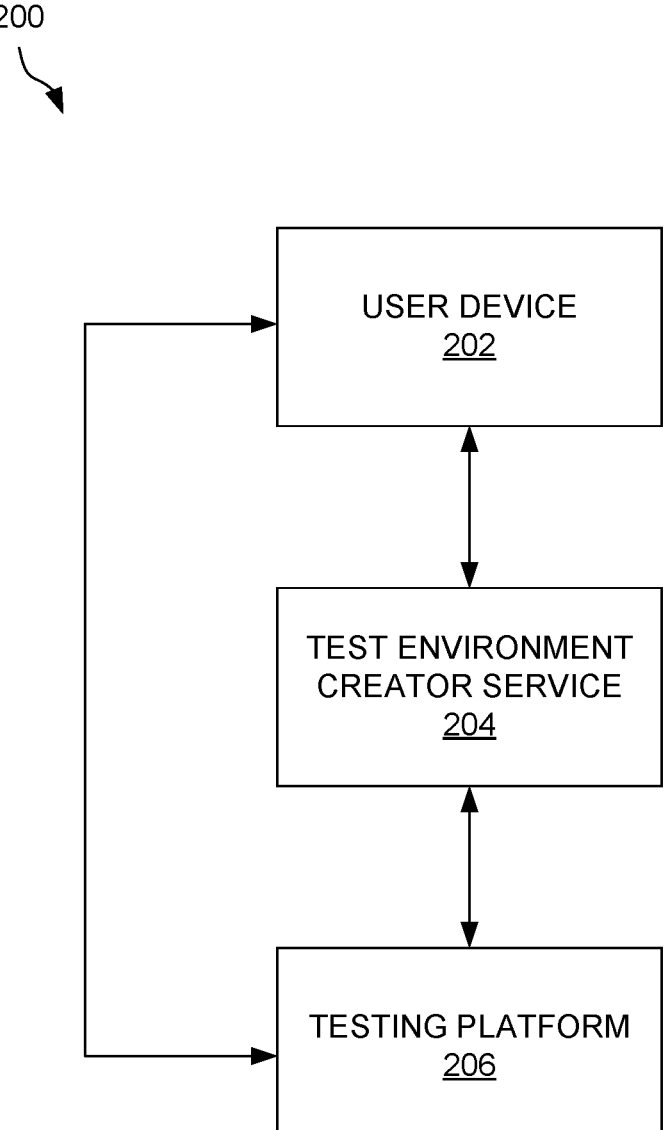
FIG. 2 illustrates a flow diagram of a system providing a test environment as a service, in accordance with one embodiment.

FIG. 1 illustrates a method 100 for of a test environment as a service, in accordance with one embodiment. The method 100 may be performed by any computer system(s) described below with respect to FIGS. 3 and/or 4. In one example described herein, the method 100 may be performed in the cloud, for example by a serverless service. Thus, the cloud may host the service which is configured for use in creating test environments.

A "service" refers to software that is configured to perform some functionality. It should be noted that service may interface end user devices and/or other services or computing systems to provide such functionality. In the present embodiments, the service is software (e.g. executing in the cloud, on cloud resources) which is configured to create test environments.

In operation 102, the service provides a user interface presenting a plurality of configurable parameters for creating a test environment. The user interface refers to one or more graphical user interfaces (GUIs) having visual elements that present the plurality of configurable parameters which are associated with creating a test environment. The visual elements may be text, icons, text input boxes, selectable options, etc. The user interface may be a web user interface (e.g. displayed on a mobile device), for example.

A "test environment" refers to any environment (e.g. configuration of hardware and/or software) to be used for testing purposes. In an embodiment, the test environment is an environment in which code is capable of being tested. The test environment may include certain data, services, applications, operating system, etc.

As mentioned above, a plurality of configurable parameters are presented via the user interface for use in creating a test environment. A "configurable parameter" refers to a parameter (e.g. aspect, etc.) of a test environment that is capable of being configured by a user. A default configuration may be predefined for each configurable parameter, for use in creating a test environment when a user has not otherwise input a configuration for that parameter.

In some various embodiments, the plurality of configurable parameters may include a cloud region, an availability zone, an instance type, and/or a disc size. In an embodiment, the plurality of configurable parameters may include a cloud in which the test environment is to be created (e.g. a cloud platform on which the test environment is to be created). In an embodiment, the plurality of configurable parameters may include code to be deployed to the test environment for testing thereof. Such code may be an application, function, service, or any other code capable of being tested. Further, multiple versions of the code may exist such that the plurality of configurable parameters may include a version of the code to be deployed to the test environment.

In another embodiment, the plurality of configurable parameters may include one or more services to be deployed to the test environment. Such services may be required (e.g. used, etc.) by the code to be tested in the test environment. In yet other embodiments, the plurality of configurable parameters may include data (e.g. populated or unpopulated tables, databases, or other data structures) to be stored in the test environment (e.g. for use by the code to be tested) or one or more applications (e.g. browsers) to be installed in the test environment.

In an embodiment, the plurality of configurable parameters include an option to create the test environment to mimic an existing production environment. An existing production environment refers to an environment that has already been created for use in deploying code therein. For example, the test environment may be a duplicate of the existing production environment. In an exemplary embodiment, the existing production environment is an environment in which code has been deployed and a defect in the code has been detected.

In operation 104, the service receives, via the user interface, user input defining configurations for one or more configurable parameters of the plurality of configurable parameters. The user input may be received in any format enabled by the user interface. For example, the format of the user input, per configurable parameter, may correspond to the type of visual element (e.g. text box, etc.) that is used to present the configurable parameter. The user input may be received by a user inputting, to the user interface, a configuration for one or more of the configurable parameters.

The user input may be received when the user selects an option to submit the input configuration(s).

In an embodiment, the user may be required to input a configuration for each configurable parameter of the plurality of configurable parameters. In another embodiment, the user may be required to input a configuration for only certain (e.g. preselected) configurable parameters of the plurality of configurable parameters. For any of the configurable parameter for which a user input configuration is not required, the above described default configuration corresponding to that configurable parameter may be used in place of the user input.

In operation 106, the service creates the test environment in accordance with the configurations. As mentioned above, the test environment may be a configuration of hardware and/or software to be used for testing purposes. In this case, the test environment may be created by configuring hardware and/or software in accordance with the configurations defined in the user input.

In an embodiment, the test environment may be a virtual test environment. A virtual test environment can be created automatically (e.g. without manual intervention). For example, the test environment may be created in a cloud (e.g. specified in the user input configurations), using virtual and/or physical resources of the cloud platform.

To this end, the method 100 may be performed to provide a service that enables user configuration of a test environment. As an option, the method 100 may include performing a health check of the test environment, once the test environment has been created, to ensure that the test environment is functional. As another option, the method 100 may include causing one or more tests to be executed on code in the test environment. As yet another option, the method 100 may include logging results (e.g. screenshots) of executing the one or more tests.

In an embodiment, the user input may define configurations for a plurality of different test environments to be created (e.g. in parallel). In this embodiment, the method 100 may include creating the plurality of different test environments (e.g. in parallel). Also in this embodiment, the method 100 may include causing one or more tests to be executed on code in each test environment of the plurality of different test environments, and further logging results of such executions for example.

It should be noted that the user interface may also include additional user selectable options, such as for defining one or more tests to be run in the test environment (i.e. to test the code), as mentioned above. These tests may be scrum tests, portfolio tests, user acceptance tests, production support tests, etc. The additional user selectable options may include a user selectable option for saving the test environment after code testing using the test environment is complete (e.g. for future use), and/or a user selectable option for deleting the test environment after code testing using the test environment is complete.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

FIG. 2 illustrates a flow diagram of a system 200 providing a test environment as a service, in accordance with one embodiment. As an option, the flow diagram may be implemented in the context of the details of the previous figure and/or any subsequent figure(s). Of course, however, the flow diagram may be implemented in the context of any desired environment. Further, the aforementioned definitions may equally apply to the description below.

As shown, a test environment creator service 204 interfaces both a user device 202 and a testing platform 206. The test environment creator service 204 may interface the user device 202 and the testing platform 206 via one or more networks. "Interfacing" refers to having a connection that allows communications therebetween. While the system 200 illustrates just one user device 202 and just one testing platform 206, it should be noted that other embodiments are contemplated in which the test environment creator service 204 interfaces multiple user devices and/or multiple testing platforms.

The test environment creator service 204 is a service that is configured to enable user configuration of test environments on-demand. The test environment creator service 204 executes in the cloud, in one embodiment. In another embodiment, the test environment creator service 204 executes locally with respect to the testing platform 206 (e.g. in the same cloud, on the same server, etc.). In an embodiment, the test environment creator service 204 may be a component of the testing platform 206. Of course, in another embodiment, the test environment creator service 204 may execute remotely from the testing platform 206, but may communicate over a network.

The test environment creator service 204 includes an interface (e.g. one or more graphical user interfaces) that presents on the user device 202 configurable parameters for creating a test environment. When the test environment creator service 204 receives from the user device 202 user input defining configurations for one or more of the configurable parameters, the test environment creator service 204 creates the test environment in accordance with the configurations.

The test environment creator service 204 can then provide (e.g. make available) the test environment to the testing platform 206 for use in testing code. The testing platform 206 may store the tests to be used for testing the code in the test environment. The testing platform 206 may execute the tests in the test environment, and analyze, log, report (e.g. to the user device 202), etc. any results of the execution of the tests.

The embodiments described herein disclose a service that is configured to enable user configuration of test environments, which may also be referred to as Test Environment as a Service (TEaaS).

Embodiments for Features/Functionalities:

User will be able to create test environment as per need and of the required code version using continuous integration, continuous delivery (CI/CD) pipeline. Multiple test environments can be created for multiple phases running in parallel. Also, for production issues (defects), a production look-alike test environment can be created immediately and the defect can be recreated/retested on the same. Basic health check monitoring will be performed to make sure that the test environment is functional. Once tests are completed the test environment can be decommissioned.

On top of default configuration for a test environment and tests, the user may have additional options such as:

1. To select specific cloud region, availability zone, instance type, disc size etc.
2. What tests to run
3. Selection of running the tests on an existing test environment or on new test environment 4. What service/code versions to be tested (including selected and deployed to the test environment using the CI/CD pipeline)

5. What test data (production data) is to be stored in the test environment

6. If a test requires only a specific set of services, the user can select those specifically, so that the test environment will be created with only specified services and not all services, hence less instances or only small instances would be required, resulting in reduction of cost/resource usage.

7. Option to run tests on a new machine

8. Option to run tests on a specific browser, or multiple browsers.

9. Option to keep/destroy the test environment once all tests are completed

10. Auto-scalability over test environment

11. Logs/screenshots will be stored

12. Test reports will be sent (e.g. over email)

13. Cloud selection (Amazon Web Service (AWS)/Azure/ Google Cloud Platform (GCP)) as per user's choice To this end, the TEaaS can allow a user to run test scripts, such as regression/sanity on an existing (i.e. saved) or new test environment with required configurations. The user can also create multiple test environments with different or the same code base for parallel test runs/phases including one for a production look-alike environment. In case of a production issue, the user can have the ability to replicate the production environment using TEaaS along with tests scripts execution to capture results with logs and screenshots as per requirements.

These embodiments allow for on-demand faster availability of test environments, are cost efficient, supports desired configurations, allow for auto-scalability.

Figure 3:
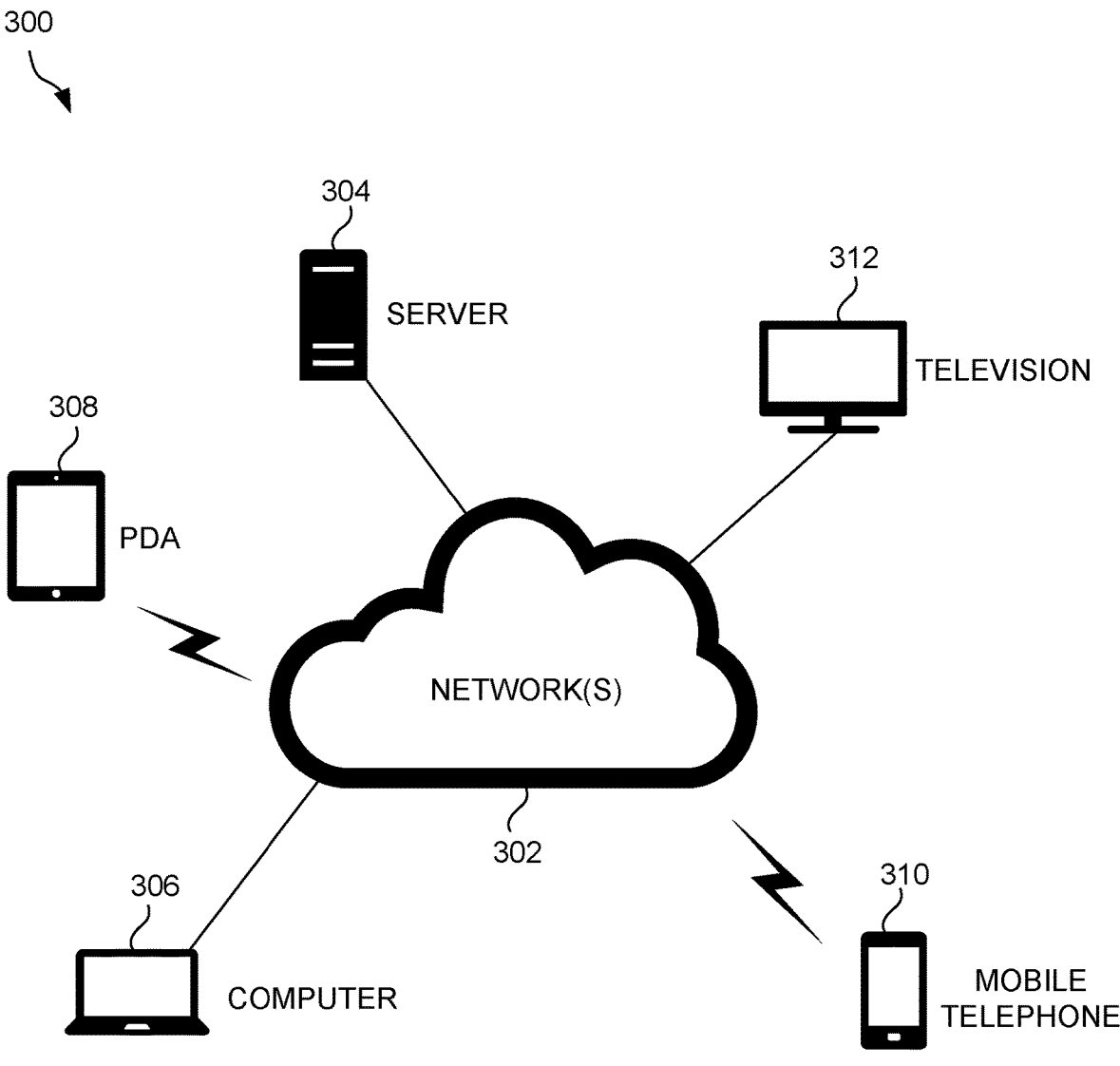
FIG. 3 illustrates a network architecture, in accordance with one possible embodiment.

FIG. 3 illustrates a network architecture 300, in accordance with one possible embodiment. As shown, at least one network 302 is provided. In the context of the present network architecture 300, the network 302 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 302 may be provided.

Coupled to the network 302 is a plurality of devices. For example, a server computer 304 and an end user computer 306 may be coupled to the network 302 for communication purposes. Such end user computer 306 may include a desktop computer, lap-top computer, and/or any other type of logic. Still yet, various other devices may be coupled to the network 302 including a personal digital assistant (PDA) device 308, a mobile phone device 310, a television 312, etc.

Figure 4:
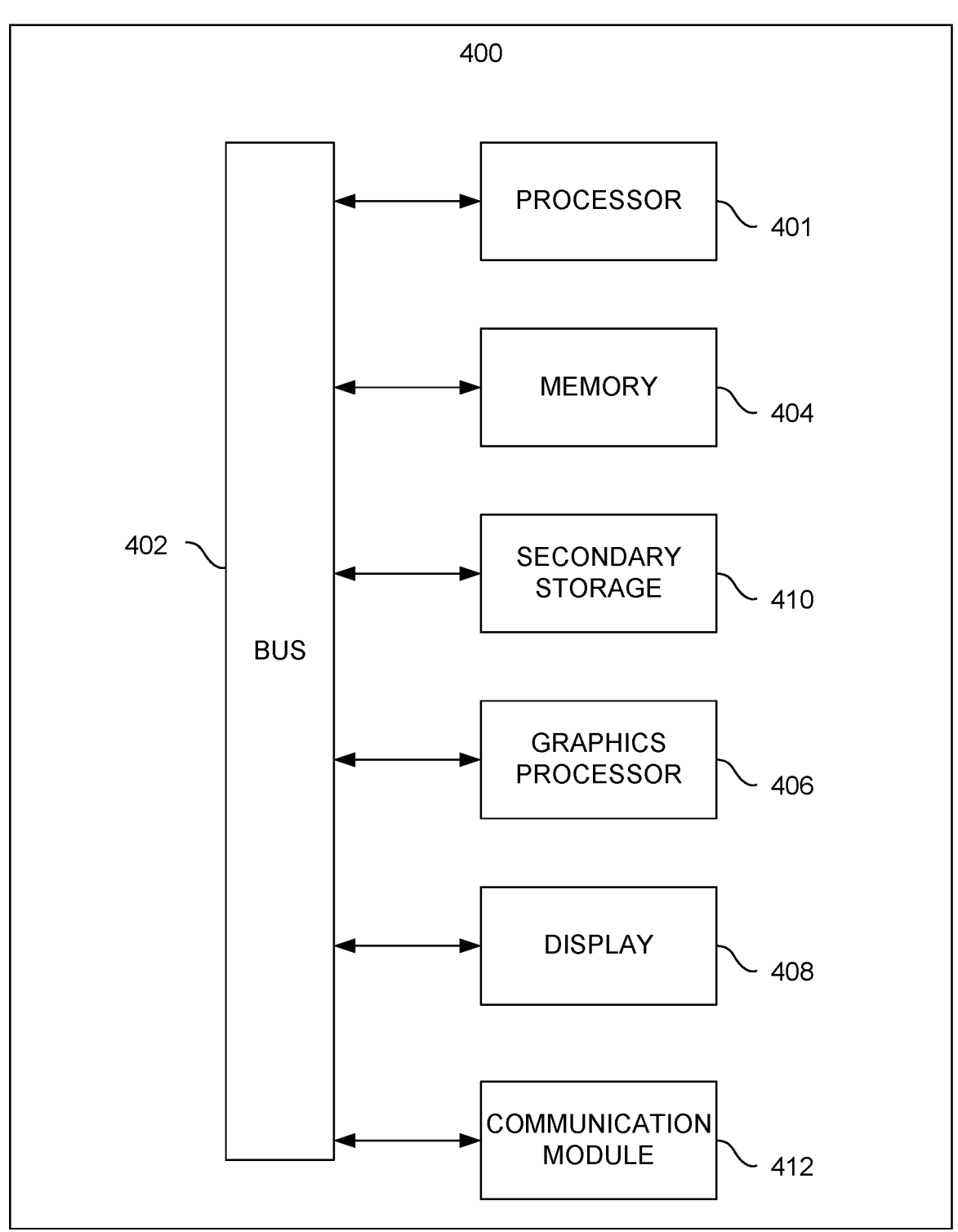
FIG. 4 illustrates an exemplary system, in accordance with one embodiment.

FIG. 4 illustrates an exemplary system 400, in accordance with one embodiment. As an option, the system 400 may be implemented in the context of any of the devices of the network architecture 300 of FIG. 3. Of course, the system 400 may be implemented in any desired environment.

As shown, a system 400 is provided including at least one central processor 401 which is connected to a communication bus 402. The system 400 also includes main memory 404 [e.g. random access memory (RAM), etc.]. The system 400 also includes a graphics processor 406 and a display 408.

The system 400 may also include a secondary storage 410. The secondary storage 410 includes, for example, solid state drive (SSD), flash memory, a removable storage drive, etc. The removable storage drive reads from and/or writes to a removable storage unit in a well-known manner.

Computer programs, or computer control logic algorithms, may be stored in the main memory 404, the secondary storage 410, and/or any other memory, for that matter. Such computer programs, when executed, enable the system 400 to perform various functions (as set forth above, for example). Memory 404, storage 410 and/or any other storage are possible examples of non-transitory computer-readable media.

The system 400 may also include one or more communication modules 412. The communication module 412 may be operable to facilitate communication between the system 400 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A non-transitory computer-readable media storing computer instructions which when executed by one or more processors of a device cause the device to:

provide, by a service as part of a continuous integration continuous delivery (CI/CD) pipeline, a user interface presenting user input elements for a plurality of configurable parameters associated with creating a test environment in which an application is capable of being tested, wherein the application has been deployed to a production environment and wherein a defect in the application has been detected;

receive, by the service via the user input elements of the user interface, a first user input for creating a first test environment, the first user input defining configurations for one or more configurable parameters of the plurality of configurable parameters, wherein the first user input indicates at least:

a first version of the application to be tested, a first set of tests to be executed to test the first version of the application, the first set of tests executable to perform regression testing and sanity testing of the first version of the application, a first set of additional applications to be used by the first version of the application during testing of the first version of the application, a first database to be used by the first version of the application during testing of the first version of the application, and a first set of unpopulated tables to be used by the first version of the application during testing of the first version of the application;

create, by the service, the first test environment as a configuration of at least one of hardware and software, in accordance with the configurations defined by the first user input, including at least:

deploying the first version of the application in the first test environment, deploying the first set of tests to the first test environment, deploying the first set of additional applications in the first test environment, storing the first database in the first test environment, and storing the first set of unpopulated tables in the first test environment;

receive, by the service via the user input elements of the user interface, a second user input for creating a second test environment, the second user input defining configurations for one or more configurable parameters of the plurality of configurable parameters, wherein the second user input indicates at least:

a second version of the application to be tested, a second set of tests to be executed to test the second version of the application, the second set of tests executable to perform the regression testing and the sanity testing of the second version of the application, a second set of additional applications to be used by the second version of the application during testing of the second version of the application, a second database to be used by the second version of the application during testing of the second version of the application, and a second set of unpopulated tables to be used by the second version of the application during testing of the second version of the application;

create, by the service, the second test environment as a configuration of at least one of hardware and software, in accordance with the configurations defined by the second user input, including at least:

deploying the second version of the application in the second test environment, deploying the second set of tests to the second test environment, deploying the second set of additional applications in the second test environment, storing the second database of data in the second test environment, and storing the second set of unpopulated tables in the second test environment; and cause, by the service, the first version of the application to execute in the first test environment during which the first version of the application uses the first set of applications, the first database, and the first set of unpopulated tables deployed to the first test environment;

cause, by the service, the second version of the application to execute in the second test environment during which the second version of the application uses the second set of applications, the second database, and the second set of unpopulated tables deployed to the second test environment;

cause, by the service, the first set of tests to be executed on the first version of the application in the first test environment in association with the execution of the first version of the application in the first test environment to generate a first result of the regression testing and the sanity testing of the first version of the application;

cause, by the service, the second set of tests to be executed on the second version of the application in the second test environment in association with the execution of the second version of the application in the second test environment to generate a second result of the regression testing and the sanity testing of the second version of the application;

report the first result of the regression testing and the sanity testing of the first version of the application; and report the second result of the regression testing and the sanity testing of the first version of the application.

2. The non-transitory computer-readable media of claim 1, wherein the service is executed in the cloud.

3. The non-transitory computer-readable media of claim 1, wherein the plurality of configurable parameters include one or more of:

a cloud region, an availability zone, an instance type, or a disc size.

4. The non-transitory computer-readable media of claim 1, wherein the plurality of configurable parameters include:

one or more browsers to be installed on the test environment, a cloud in which the test environment is to be created, and an option to create the test environment to mimic an existing production environment, wherein the existing production environment is an environment in which code has been deployed and a defect in the code has been detected.

5. The non-transitory computer-readable media of claim 1, wherein the user interface further presents:

user selectable options for defining one or more tests to be run in the test environment.

6. The non-transitory computer-readable media of claim 1, wherein the user interface further presents at least one of:

a user selectable option for saving the test environment after code testing using the test environment is complete, or a user selectable option for deleting the test environment after code testing using the test environment is complete.

7. The non-transitory computer-readable media of claim 1, wherein the device is further caused to:

log results of executing the first set of tests and the second set of tests.

8. The non-transitory computer-readable media of claim 7, wherein the results include screenshots.

9. The non-transitory computer-readable media of claim 1, wherein the first test environment and the second test environment are created in parallel.

10. The non-transitory computer-readable media of claim 1, wherein the device is further caused to:

perform a health check of the first test environment, once the first test environment has been created, to ensure that the first test environment is functional; and perform a health check of the second test environment, once the second test environment has been created, to ensure that the second test environment is functional.

11. The non-transitory computer-readable media of claim 1, wherein the first user input further includes at least:

a first cloud platform on which the first test environment is to be created; and wherein creating the first test environment includes at least:

creating the first test environment on the first cloud platform.

12. The non-transitory computer-readable media of claim 1, wherein the service does not require a user to provide input for at least one configurable parameter of the plurality of configurable parameters, and wherein a default parameter predefined for the at least one configurable parameter is used to create the test environment when the user input does not include a configuration for the at least one configurable parameter.

13. The non-transitory computer-readable media of claim 1, wherein the user input elements each include selectable options.

14. The non-transitory computer-readable media of claim 1, wherein the first set of tests are different from the second set of tests.

15. A method, comprising:

at a computer system:

providing, by a service as part of a continuous integration continuous delivery (CI/CD) pipeline, a user interface presenting user input elements for a plurality of configurable parameters associated with creating a test environment in which an application is capable of being tested, wherein the application has been deployed to a production environment and wherein a defect in the application has been detected;

receiving, by the service via the user input elements of the user interface, a first user input for creating a first test environment, the first user input defining configurations for one or more configurable parameters of the plurality of configurable parameters, wherein the first user input indicates at least:

a first version of the application to be tested, a first set of tests to be executed to test the first version of the application, the first set of tests executable to perform regression testing and sanity testing of the first version of the application, a first set of additional applications to be used by the first version of the application during testing of the first version of the application, a first database to be used by the first version of the application during testing of the first version of the application, and a first set of unpopulated tables to be used by the first version of the application during testing of the first version of the application;

creating, by the service, the first test environment as a configuration of at least one of hardware and software, in accordance with the configurations defined by the first user input, including at least:

deploying the first version of the application in the first test environment, deploying the first set of tests to the first test environment, deploying the first set of additional applications in the first test environment, storing the first database in the first test environment, and storing the first set of unpopulated tables in the first test environment;

receiving, by the service via the user input elements of the user interface, a second user input for creating a second test environment, the second user input defining configurations for one or more configurable parameters of the plurality of configurable parameters, wherein the second user input indicates at least:

a second version of the application to be tested, a second set of tests to be executed to test the second version of the application, the second set of tests executable to perform the regression testing and the sanity testing of the second version of the application, a second set of additional applications to be used by the second version of the application during testing of the second version of the application, a second database to be used by the second version of the application during testing of the second version of the application, and a second set of unpopulated tables to be used by the second version of the application during testing of the second version of the application;

creating, by the service, the second test environment as a configuration of at least one of hardware and software, in accordance with the configurations defined by the second user input, including at least:

deploying the second version of the application in the second test environment, deploying the second set of tests to the second test environment, deploying the second set of additional applications in the second test environment, storing the second database of data in the second test environment, and storing the second set of unpopulated tables in the second test environment; and causing, by the service, the first version of the application to execute in the first test environment during which the first version of the application uses the first set of applications, the first database, and the first set of unpopulated tables deployed to the first test environment;

causing, by the service, the second version of the application to execute in the second test environment during which the second version of the application uses the second set of applications, the second database, and the second set of unpopulated tables deployed to the second test environment;

causing, by the service, the first set of tests to be executed on the first version of the application in the first test environment in association with the execution of the first version of the application in the first test environment to generate a first result of the regression testing and the sanity testing of the first version of the application;

causing, by the service, the second set of tests to be executed on the second version of the application in the second test environment in association with the execution of the second version of the application in the second test environment to generate a second result of the regression testing and the sanity testing of the second version of the application;

reporting the first result of the regression testing and the sanity testing of the first version of the application; and reporting the second result of the regression testing and the sanity testing of the first version of the application.

16. A system, comprising:

a non-transitory memory storing instructions; and one or more processors in communication with the non-transitory memory that execute the instructions to:

provide, by a service as part of a continuous integration continuous delivery (CI/CD) pipeline, a user interface presenting user input elements for a plurality of configurable parameters associated with creating a test environment in which an application is capable of being tested, wherein the application has been deployed to a production environment and wherein a defect in the application has been detected;

receive, by the service via the user input elements of the user interface, a first user input for creating a first test environment, the first user input defining configurations for one or more configurable parameters of the plurality of configurable parameters, wherein the first user input indicates at least:

a first version of the application to be tested, a first set of tests to be executed to test the first version of the application, the first set of tests executable to perform regression testing and sanity testing of the first version of the application, a first set of additional applications to be used by the first version of the application during testing of the first version of the application, a first database to be used by the first version of the application during testing of the first version of the application, and a first set of unpopulated tables to be used by the first version of the application during testing of the first version of the application;

create, by the service, the first test environment as a configuration of at least one of hardware and software, in accordance with the configurations defined by the first user input, including at least:

deploying the first version of the application in the first test environment, deploying the first set of tests to the first test environment, deploying the first set of additional applications in the first test environment, storing the first database in the first test environment, and storing the first set of unpopulated tables in the first test environment;

receive, by the service via the user input elements of the user interface, a second user input for creating a second test environment, the second user input defining configurations for one or more configurable parameters of the plurality of configurable parameters, wherein the second user input indicates at least:

a second version of the application to be tested, a second set of tests to be executed to test the second version of the application, the second set of tests executable to perform the regression testing and the sanity testing of the second version of the application, a second set of additional applications to be used by the second version of the application during testing of the second version of the application, a second database to be used by the second version of the application during testing of the second version of the application, and a second set of unpopulated tables to be used by the second version of the application during testing of the second version of the application;

create, by the service, the second test environment as a configuration of at least one of hardware and software, in accordance with the configurations defined by the second user input, including at least:

deploying the second version of the application in the second test environment, deploying the second set of tests to the second test environment, deploying the second set of additional applications in the second test environment, storing the second database of data in the second test environment, and storing the second set of unpopulated tables in the second test environment; and cause, by the service, the first version of the application to execute in the first test environment during which the first version of the application uses the first set of applications, the first database, and the first set of unpopulated tables deployed to the first test environment;

cause, by the service, the second version of the application to execute in the second test environment during which the second version of the application uses the second set of applications, the second database, and the second set of unpopulated tables deployed to the second test environment;

cause, by the service, the first set of tests to be executed on the first version of the application in the first test environment in association with the execution of the first version of the application in the first test environment to generate a first result of the regression testing and the sanity testing of the first version of the application;

cause, by the service, the second set of tests to be executed on the second version of the application in the second test environment in association with the execution of the second version of the application in the second test environment to generate a second result of the regression testing and the sanity testing of the second version of the application;

report the first result of the regression testing and the sanity testing of the first version of the application; and report the second result of the regression testing and the sanity testing of the first version of the application.

\* \* \* \* \*